(No Model.) 2 Sheets—Sheet 2.

J. FRASER.
CLUTCH.

No. 492,625. Patented Feb. 28, 1893.

Witnesses.

Inventor.
James Fraser.
by Herbert W. T. Jenner.
Attorney.

THE NORRIS PETERS CO., PHOTO-LITHO., WASHINGTON, D. C.

UNITED STATES PATENT OFFICE.

JAMES FRASER, OF LONDON, ENGLAND.

CLUTCH.

SPECIFICATION forming part of Letters Patent No. 492,625, dated February 28, 1893.

Application filed May 31, 1892. Serial No. 434,963. (No model.)

*To all whom it may concern:*

Be it known that I, JAMES FRASER, engineer, a subject of the Queen of Great Britain and Ireland, residing at South Kensington, London, in the county of Middlesex, England, have invented certain new and useful Improvements in Clutches; and I do hereby declare the following to be a full, clear, and exact description of the invention, such as will enable others skilled in the art to which it appertains to make and use the same.

This invention relates to clutches; and it consists in the novel construction and combination of the parts hereinafter fully described and claimed.

Figure 1:
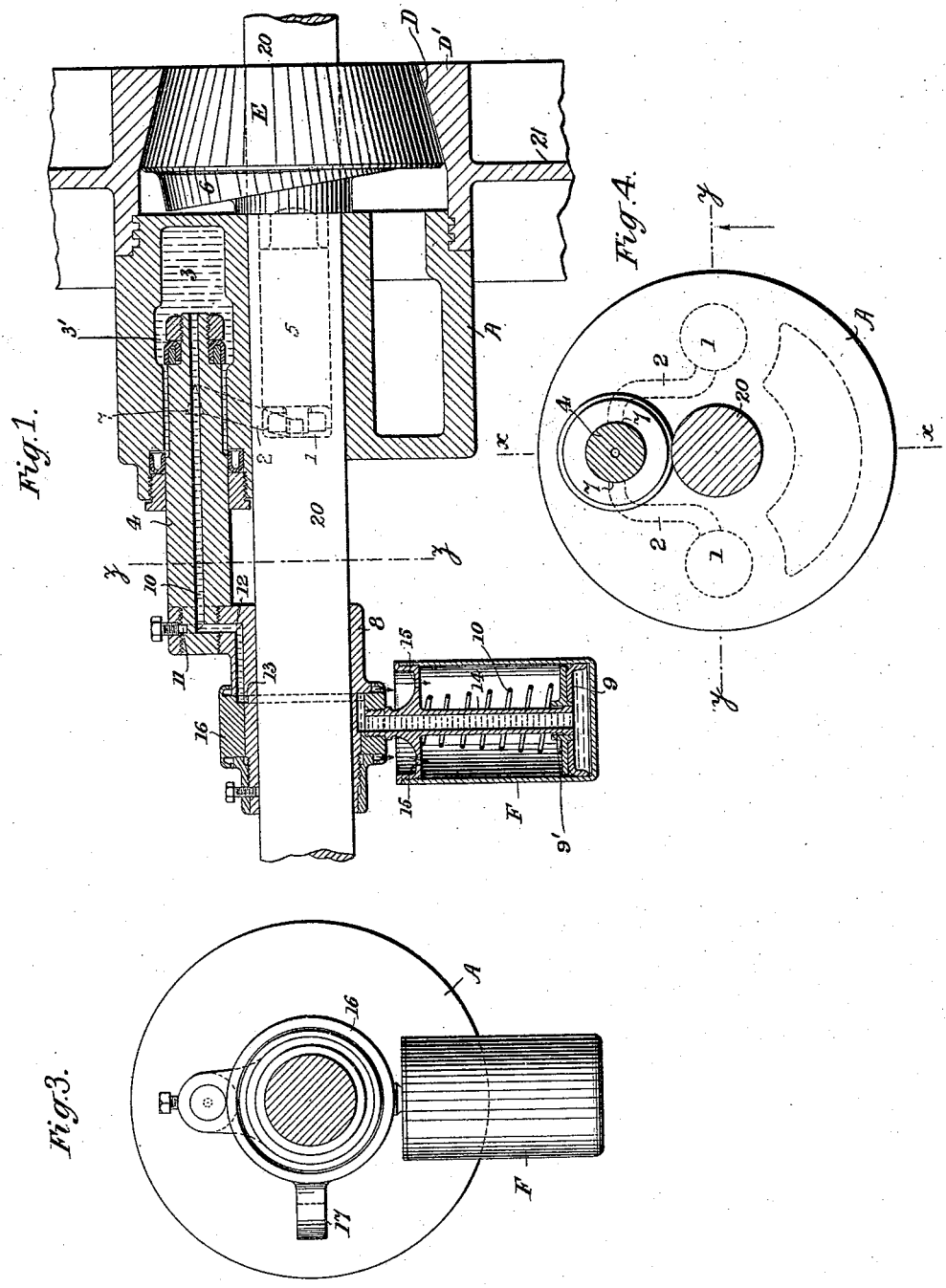
Figure 2:
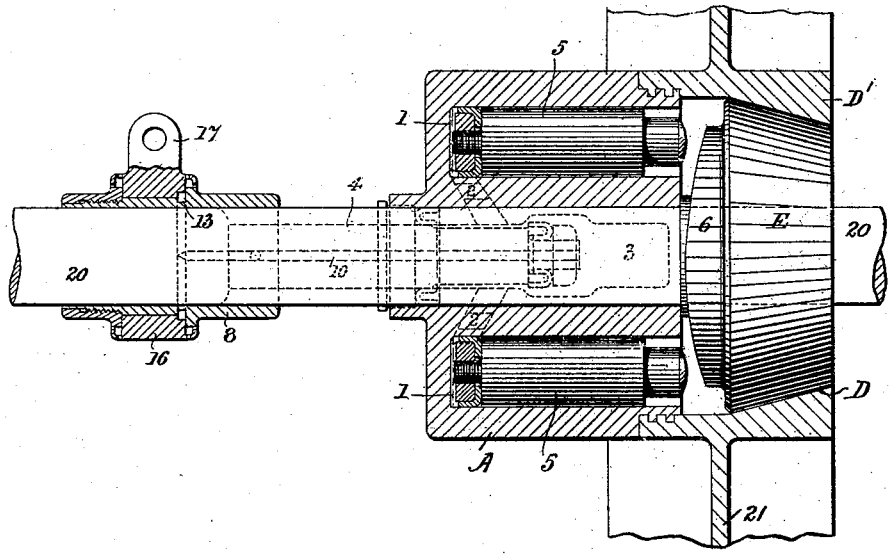

In the drawings: Figure 1 is a longitudinal section through the clutch, taken on the line $x\ x$ in Fig. 4. Fig. 2 is a longitudinal section through the clutch, taken on the line $y\ y$ in Fig. 4. Fig. 3 is an end view of the clutch. Fig. 4 is a cross-section taken on the line $z\ z$ in Fig. 1.

E is a cone secured upon a driving shaft 20, and D' is the hub of a pulley or wheel 21 provided with a conical socket D, for the cone E to engage with. The parts D and E constitute a friction clutch for coupling the wheel to the shaft, and it is immaterial whether the shaft drives the wheel or is driven by the wheel, as the action of the clutch is the same in either case.

A casting A is secured to the hub D', and 1 are two cylinders formed in the said casting on opposite sides of the shaft 20. Plungers 5 are adapted to slide in the cylinders 1, and bear against a face cam 6 on the cone E when pressed forward. A cylinder 3 is also formed in the casting A, and is provided with the chamber 3' at about the middle of its length. The cylinder 3 communicates with the cylinders 1 by means of the ports 7 and passages 2 as shown in Fig. 4. A plunger 4 is adapted to slide in the cylinder 3. The wheel 21 is coupled to the shaft by pressing the cone against the conical socket D. This is accomplished by pushing the plunger 4 into the cylinder 3 which is filled with oil or with other fluid. The oil is forced from the cylinder 3 into the spaces of the cylinders 1 behind the plungers 5, and the said plungers 5 are forced forward against the cam 6. The plungers 5 force the cone E against the conical socket D of the wheel 21. The rotary motion of the cam 6 reciprocates the plungers 5 alternately in opposite directions and forces the oil in the cylinders back and forth through the cylinder 3 as long as the packed end of the plunger 4 is in the chamber 3'. The surplus oil in the cylinder 3 passes down a hole 10 in the plunger 4 into a reservoir F provided with a spring-pressed piston (hereinafter more fully described) until the packed end of the plunger passes into the end of the cylinder beyond the chamber 3'. The pressure of the oil in the cylinders 1 has now increased, and is the same as provided for, partly by the adjustment of the said spring-actuated piston, but chiefly by the frictional resistance of the oil in the passages which connect the cylinders together. The plungers 5 cease to reciprocate as they are firmly pressed by the oil against the cam 6, and the cylinders 1 and the wheel 21 revolve simultaneously with the shaft 20. The alternate reciprocation of the plungers 5 by the steady pressure of the oil behind them and the irregular pressure of the cam in front of them causes the cone E to be forced against the conical socket D with a gradually increasing pressure until the said parts D and E attain the same velocity. The clutch is disengaged by moving the plunger 4 in the reverse direction from that required to effect the coupling action. This sucks the oil out of the cylinders 1 and draws back the plungers 5 from the cam 6. The cone E then disengages itself automatically from the socket D, the angle of the parts being such that they will not remain coupled unless forcibly pressed together. A sleeve 8 is journaled on the shaft 22 and is secured to the plunger 4. The sleeve 8 has a circumferential groove 13 and a passage 12 connecting the said groove with the hole 10 in the plunger 4. A collar 16 is journaled on the sleeve 8 and does not revolve with the shaft or with the pulley.

F is the oil reservoir provided with a hollow stem 14 secured to the collar 16 and communicating with the circumferential groove 13 of the sleeve 8. The hollow stem 14 depends within the reservoir, being connected to the perforated head 15 which forms the top of the reservoir. A piston 9 slides in the reservoir F upon the stem 14 and is pressed toward the bottom of the reservoir by the spring 10' arranged between the piston 9 and the head 15. A lug 17 is provided on the sleeve 16 for the attachment of any approved form of operating lever for sliding the plunger 4, and the said lever can also assist in preventing the reservoir and the collar from revolving. When the packed end of the plunger 4 passes into the end of the cylinder 3 beyond the chamber 3', it forces the oil into the reservoir F below the piston 9 against the pressure of the spring 10. Any oil which drips past the collar 16 passes through the perforated head 15 into the reservoir F. The surplus oil forced into the reservoir F escapes from under the piston into the upper part of the reservoir F around the stem 14, the said stem being provided with a recess or groove 9' which permits the passage of oil from one side of the piston to the other when the piston is raised. Additional oil can be placed in the reservoir at any time by pouring it into the head 15. When the plungers 4 and 1 are drawn back the spring-pressed piston 9 forces oil from the reservoir F into the cylinder 3 to make up for any deficiency.

What I claim is—

1. The combination, with the two halves of a friction clutch, of a face cam carried by one half of the clutch, two communicating cylinders carried by the other half of the clutch, the plungers, and means for propelling the said plungers against the said cam, whereby the two halves of the clutch are placed in contact and the said plungers are reciprocated until both halves of the clutch rotate with the same velocity.

2. The combination, with the cone and the face cam carried by it, of the hub having a conical socket, two communicating cylinders carried by the said hub, the plungers, and means for propelling the said plungers against the said cam, whereby the said cone is pressed against the said socket and the said plungers are reciprocated until the cone and socket revolve with equal velocity.

3. The combination, with the two halves of a friction clutch, of a face cam carried by one half of the clutch, three communicating cylinders carried by the other half of the clutch, two plungers adapted to engage with the said cam and a plunger adapted to be moved to propel the aforesaid plungers, and thereby to gradually connect the halves of the clutch, substantially as set forth.

4. The combination, with the two halves of a friction clutch, of a face cam carried by one half of the clutch, three communicating cylinders carried by the other half of the clutch, two plungers adapted to engage with the said cam, a plunger adapted to be moved to propel the aforesaid plungers, and a reservoir provided with a spring-pressed piston and connected with the said cylinders, whereby the said cylinders are supplied with fluid under pressure, substantially as set forth.

5. The combination, with the cylinder 3 provided with the chamber 3'; and the plunger working in the said cylinder and adapted to be moved to connect the halves of the clutch and provided with the hole 10; of a sleeve mounted on the clutch shaft and secured to the said plunger and provided with the passage 12 and groove 13 connected with the said hole 10, a collar journaled on the said sleeve, an oil reservoir provided with a hollow stem secured to the said collar and connected to the groove 13, and a spring-pressed piston sliding in the said reservoir and adapted to force the oil into the cylinder 3, substantially as set forth.

6. In a clutch mechanism, the combination, with the two halves of a friction clutch, of cylinders carried by one half of the said clutch, plungers sliding in the said cylinders and operating to place the halves of the clutch in contact, a cylindrical oil-reservoir supported by the clutch shaft and provided with a perforated head and a hollow stem having an external recess 9', and a spring-pressed piston sliding on the said stem and in the said reservoir and adapted to supply the clutch operating cylinders with oil, substantially as set forth.

7. The combination, with the two halves of a friction clutch, of hydraulic clutch-operating-devices adapted to be moved by hand to place the halves of the clutch in contact, and an operating device—such as a cam—carried by one half of the clutch and operating to produce an additional movement of the said hydraulic devices, whereby the halves of the clutch are automatically pressed together and are gradually caused to revolve at the same speed.

In testimony whereof I affix my signature in presence of two witnesses.

JAMES FRASER.

Witnesses:
G. F. WARREN,
T. F. BARNES.